United States Patent [19]

Blomkvist et al.

[11] Patent Number: 4,474,069

[45] Date of Patent: Oct. 2, 1984

[54] MAGNETOELASTIC TRANSDUCER

[75] Inventors: Kent Blomkvist, Surahammar; Jan Nordvall, Västerås, both of Sweden

[73] Assignee: ASEA Aktiebolag, Västerås, Sweden

[21] Appl. No.: 410,657

[22] Filed: Aug. 23, 1982

[30] Foreign Application Priority Data

Aug. 25, 1981 [SE] Sweden ................................ 8105022

[51] Int. Cl.$^{3}$ ................................................ G01L 1/12

[52] U.S. Cl. ............................ 73/862.69; 73/DIG. 2; 336/20; 336/234

[58] Field of Search .............. 73/862.69, DIG. 2, 779; 324/209; 336/20, 234, 233

[56] References Cited

U.S. PATENT DOCUMENTS

| | | | |
|---|---|---|---|
| 3,103,810 | 3/1963 | Agerman et al. . | |
| 3,742,759 | 7/1973 | Nishimura | 73/862.69 |
| 4,025,379 | 5/1977 | Whetstone | 336/234 X |
| 4,048,851 | 6/1977 | Portier | 73/DIG. 2 X |

FOREIGN PATENT DOCUMENTS

| | | | |
|---|---|---|---|
| 658570 | 7/1938 | Fed. Rep. of Germany . | |
| 2058267 | 11/1974 | Fed. Rep. of Germany . | |
| 55-42060 | 3/1980 | Japan | 324/209 |
| 1201111 | 8/1970 | United Kingdom | 73/862.69 |

*Primary Examiner*—Charles A. Ruehl
*Assistant Examiner*—Brian R. Tumm
*Attorney, Agent, or Firm*—Watson, Cole, Grindle & Watson

[57] ABSTRACT

A magnetoelastic transducer comprises a plurality of sheets assembled together into a sheet package, the sheet package being provided in known manner with at least one excitation winding and at least one measuring winding. The sheet package comprises first sheets of non-magnetic material of austenitic steel, interleaved with second sheets of compound type, each of the sheets of compound type comprising an inner core layer of magnetic material, for example silicon steel, metallically connected on each of its sides to a respective outer layer of non-magnetic material of austenitic steel.

7 Claims, 2 Drawing Figures

MAGNETOELASTIC TRANSDUCER

TECHNICAL FIELD

This invention relates to a magnetoelastic transducer of the kind comprising a plurality of sheets of both magnetic and non-magnetic material assembled together, for example by glueing, into a stack or package of sheets. This sheet package is provided with at least two windings, namely at least one excitation winding and at least one measuring winding.

BACKGROUND ART

Known magnetoelastic transducers (see, for example U.S. Pat. No. 2,895,332) consist of a sheet package which is arranged to receive a certain magnetic flux configuration with the aid of excitation windings. When the transducer is mechanically loaded, this magnetic flux configuration is changed, and the change is detected by means of one or more measuring windings. The various windings may be mounted in the sheet package of the transducer, in which case they are arranged to pass through holes in the sheet package, or they may surround the sheet package.

These known magnetoelastic transducers have a large power consumption, especially in the case of transducers which are designed to withstand great loads. The large power consumption is due to the fact that the transducer must be excited to a substantial degree. The large volume that has to be excited also contributes to the need to use only relatively low frequencies for the supply voltage, since higher frequencies result in even greater losses. A high supply frequency is, however, desirable, since it is then possible to measure more rapid force variations. In addition, the components included in associated electronic equipment, for example capacitors, will be less expensive. One way of reducing the power consumption is to influence the magnetic flux configuration in the transducer by changing the configuration of the holes which receive the windings. However, this method only gives relatively marginal effects on the power consumption.

Another disadvantage of the known magnetoelastic transducers is that the power requirement varies with, and is approximately proportional to, the size of the transducer. For example, in the case of force-measuring transducers, the size is approximately proportional to the nominal force or load, and therefore large transducers require a large supply power, which involves the provision of expensive supply equipment. The supply devices and the signal processing equipment are also more complicated if large variations in signal levels have to be dealt with.

By reducing the volume of the magnetic material, the electric power demand will decrease. This reduction in material can be accomplished by replacing a certain number of the sheets of magnetic material with sheets of non-magnetic material. This is entirely feasible and it has been found that up to 99.5% of the sheets can be replaced by non-magnetic material. This way of decreasing the magnetic mateial is described in, for example, Swedish published patent application No. 339,125. However, non-magnetic sheet material, for example of austenitic stainless steel type, has a coefficient of expansion which differs considerably from the coefficient of expansion of magnetic sheet metal, for example silicon steel. Also, the coefficients of elasticity of the two materials are different. For transducers with mechanically assembled sheet packages, such as those disclosed in Swedish published patent application No. 399,125, or with glued sheet packages, this results in a very high temperature dependence for both the neutral point and the sensitivity of the transducer. In order that a glued package of sheets with different properties (modulus of elasticity and coefficient of expansion) shall not crack when exposed to varying load and temperatures conditions, it is a condition that the coefficients of elasticity and the coefficients of expansion of the materials must not be too different. Thus, it has been determined that the coefficient of elasticity of the non-magnetic replacement material should not vary by more than ±20% from the coefficient of elasticity of the magnetic sheet material used, and that the coefficient of expansion of the non-magnetic replacement material should not deviate by more than ±25% from the coefficient of expansion of the magnetic sheet material. These material requirements make it difficult, at the present time, to find inexpensive replacement materials. Examples of materials that have proved to be suitable are the materials known under the Registered Trade Marks "INCONEL" and "NIMONIC", but these are very expensive materials.

The present invention aims to provide a magnetoelastic transducer of the kind referred to which has a reduced amount of magnetic material without giving rise to the problems mentioned above.

DISCLOSURE OF THE INVENTION

According to the invention, in a magnetoelastic transducer of the kind comprising a plurality of sheets assembled into a sheet package, the sheet package being provided with at least one excitation winding and at least one measuring winding, the sheet package comprises sheets of non-magnetic material and sheets of compound type, each of the sheets of compound type comprising an inner core layer of magnetic material metallically (bonded) connected on each of its sides to an outer layer of non-magnetic material.

The compound sheets of a transducer in accordance with the invention preferably consist of a thin core layer of silicon steel, on each side of which there is applied a layer of less expensive austenitic steel. A metallic connection (bonding) must be achieved between the three layers in the same way as for bimetals. The silicon steel layer suitably constitutes less than one-third of the thickness of the compound sheet, which typically has a total thickness of about 0.5 mm. The lower limit to the thickness of the magnetic layer is determined by the granular size of the material. In the materials at present available, it is typically 100 microns.

A magnetoelastic transducer in accordance with the invention has several advantages. By metallically connecting (bonding) the active, magnetic layer and the non-magnetic, passive layers of the compound sheets, and if the magnetic layer is sufficiently thin, the resulting coefficient of expansion of the compound sheets will deviate to a minimum degree from that of the completely passive, non-magnetic sheets. It will therefore be possible to join the compound and non-magnetic sheets together into a package by conventional methods such as glueing, the package consisting of a minor part (a few percent) of active compound sheets and a predominant part of non-magnetic sheets. The advantage of this is that the predominant part, the filling material, consists of inexpensive sheet metal, whereas the active, expensive sheets constitute a very small percentage of the total.

One advantage of a transducer in accordance with the invention is that it is possible to choose the number of active sheets so that smaller transducers receive a greater relative part of active material. In this way, supply power and also the nominal output signal can be maintained essentially independent of the size of the transducer. The latter contributes to making the necessary electronic equipment less expensive.

BRIEF DESCRIPTION OF DRAWINGS

The invention will now be described in greater detail, and by way of example, with reference to the accompanying drawings.

In the drawings.

DESCRIPTION OF PREFERRED EMBODIMENTS

Figure 1:
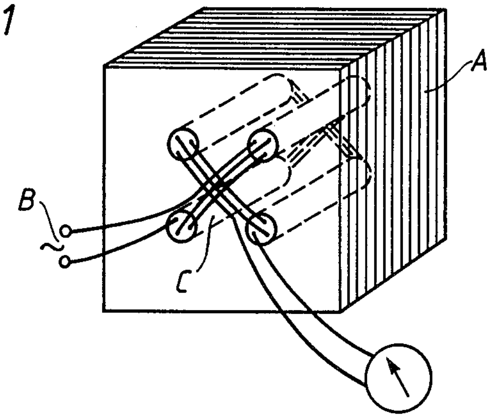
FIG. 1 shows a sheet package A with excitation windings B and measuring windings C of a magnetoelastic transducer constructed according to the present invention and FIG. 2 shows a schematic view of a part of the sheet package A.
Figure 2:
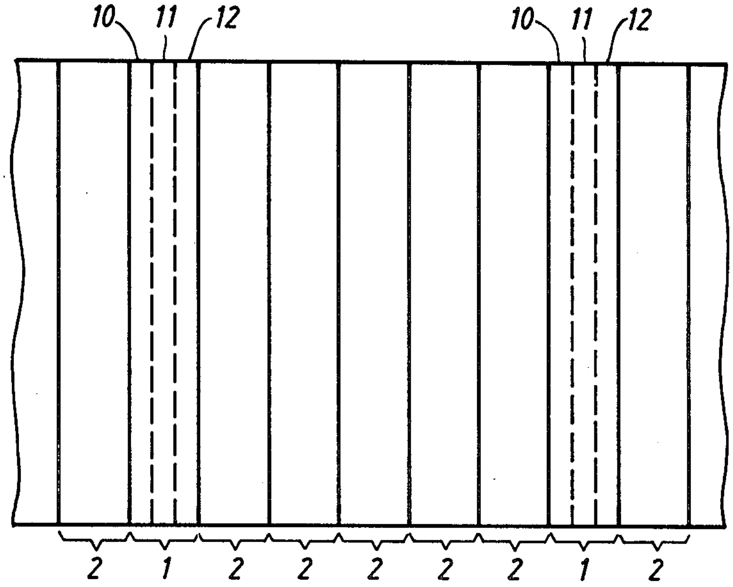

FIG. 1 shows a sheet package A with excitation windings B and measuring windings C of the inventive magnetoelastic transducer. FIG. 2 shows schematically shows the sheet package A, this sheet package including a plurality of compound sheets 1 distributed one by one throughout an assembly of sheets 2 of non-magnetic material. Each of the compound sheets 1 comprises three layers 10, 11 and 12 which are metallically connected (bonded) together by means of cold bonded strip steel technique. The middle layer 11 consists of magnetic material, for example the silicon steel material that is used at the present time in the sheet packages of magnetoelastic transducers, and the two outer layers 10 and 12 consist of non-magnetic steel of austenitic steel type. The non-magnetic, passive sheets 2 consist, for example, of the same material as in the outer layers 10, 12 of the compound sheets 1.

When current is supplied to the excitation winding(s) of the transducer, only the magnetizable core (i.e. the layer 11) in the compound sheets is magnetized. The other material remains non-magnetic.

As will be clear from FIG. 2, the volume of material that has to be magnetized, in use of the transducer, has been considerably reduced compared with a sheet package made entirely of magnetic material. Consequently, the power consumption of the transducer is reduced in approximately the same proportion.

Due to the metallic connection (bonding) between the layers 10, 11 and 12 of the compound sheets 1, the material problems are reduced to a substantial extent. This is because it is no longer so important that the coefficients of elasticity and the coefficients of expansion of the materials of the different layers should lie within the above-mentioned limits. By the homogeneous metallic connection (bonding) between the different materials of the compound sheets 1, the stresses which occur at the boundary layers due to temperature variations will be equal in all directions in the planes of the boundary layers, so magnetoelastic transducers, which are only sensing differences in perpendicular stresses, will have an uninfluenced output from these stresses.

In spite of the fact that both the materials in the compound sheets 1 are relatively different as regards their coefficients of elasticity and expansion, the compound sheets 1 will be very close to the non-magnetic, passive sheets 2 as regards their properties. Consequently, the compound sheets 1 and the non-magnetic sheets 2 can be joined together in a conventional manner, for example by glueing, without causing any major problems.

A transducer in accordance with the invention can have any desired shape, and the excitation and measuring windings may be associated with the sheet package in any conventional manner which is employed at the present time with magnetoelastic transducers.

What is claimed is:

1. In a magnetoelastic transducer comprising a plurality of sheets assembled into a sheet package, said sheet package being provided with at least one excitation winding and at least one measuring winding, the improvement according to which said sheet package comprises first sheets of non-magnetic material interleaved with second sheets of compound type, each of said sheets of compound type comprising an inner core layer of magnetic material metallically bonded on each of its sides to a respective outer layer of non-magnetic material, said core layer having a thickness not exceeding one-third of the total thickness of the second sheet.

2. A magnetoelastic transducer according to claim 1, wherein the layers of non-magnetic material of said second sheets are of the same material as that of said first sheets.

3. A magnetoelastic transducer according to claim 1, wherein said first sheets are made of austenitic stainless steel.

4. A magnetoelastic transducer according to claim 1, wherein said non-magnetic layers of said second sheets are made of austenitic stainless steel.

5. A magnetoelastic transducer according to claim 1, wherein the inner core layers of said second sheets are made of silicon steel.

6. A magnetoelastic transducer according to claim 1, wherein the first and second sheets of said sheet package are glued together.

7. A magnetoelastic transducer according to claim 1, wherein the first and second sheets of said sheet package are welded together.

* * * * *